United States Patent

[11] 3,563,386

[72] Inventor Ken-Ichiro Kurita
 Suita, Japan
[21] Appl. No. 17,152
[22] Filed Mar. 6, 1970
 Continuation-in-part of application Ser. No. 780,723, Dec. 3, 1968.
[45] Patented Feb. 16, 1971
[73] Assignee Kurita Machinery Manufacturing Company Limited
 Osaka, Japan

[54] APPARATUS FOR RELEASING AND COUPLING FILTER PLATES IN A FILTER PRESS
 4 Claims, 4 Drawing Figs.
[52] U.S. Cl. .................................................... 210/230, 100/198, 210/236
[51] Int. Cl. .................................................... B01d 25/12
[50] Field of Search.......................................... 210/225, 230, 236; 100/178

[56] References Cited
UNITED STATES PATENTS

| | | | |
|---|---|---|---|
| 3,331,511 | 7/1967 | Kurita | 210/230 |
| 3,360,130 | 12/1967 | Kaga | 210/225 |
| 3,366,243 | 1/1968 | Kurita | 210/225 |

Primary Examiner—Reuben Friedman
Assistant Examiner—C. M. Ditlow
Attorney—Wenderoth, Lind and Ponack ABSTRACT: Each of the filter plates is provided with stud members disposed horizontally or vertically on opposite sides. Hook members are pivotally mounted on each filter plate so as to be associated with stud members on the next adjacent filter plate. A release arm formed on the actuating member and adapted to be engaged with a tail member of the hook member is associated with a release pin on the preceding filter plate so that when the preceding filter plate is separated from the following adjacent plate the actuating member on the following plate is forced to operate to release the hook member thereon from the stud member on the next filter plate.

KEN-ICHIRO KURITA,
INVENTOR

ATTORNEYS

KEN-ICHIRO KURITA,
INVENTOR

BY Wenderoth, Lind & Ponack
ATTORNEYS

APPARATUS FOR RELEASING AND COUPLING FILTER PLATES IN A FILTER PRESS

The present application is a continuation-in-part of my copending U.S. Pat. application Ser. No. 780,723 filed Dec. 3, 1968.

BACKGROUND OF THE INVENTION

The present invention relates to an apparatus in a filter press for releasing and coupling filter plates one by one and more particularly to an apparatus for releasing and coupling filter plates in self-actuating manner.

In general, the adjacent filter plates in a filter press are stuck to each other quite tightly due to the sticking property of filter cake which is attributable to the quality of the liquid treated. Accordingly, when, for instance, the filter plates are to be moved one by one to remove the filter cake, two or more of the plates are stuck and moved together and there arises a difficulty in releasing them from each other. Among prior arts so far proposed to overcome such difficulty there is U.S. Pat. No. 3,366,243 which requires provision of inversed V-shaped links connecting each adjacent two filter plates on opposite sides thereof and intended for other purposes. In accordance with the present invention, filter plates can be released or coupled with high reliability without employing such links.

SUMMARY OF THE INVENTION

An object of the present invention is to provide an apparatus in which each of the filter plates is provided with hook members which are adapted for engagement with stud members on the next filter plate and when one filter plate is moved, the hook members on the next filter plate are released from the stud members of the third plate, the apparatus thus making it possible to effect separation of the filter plates one by one successively and reliably.

Another object of the present invention is to provide a structure in which the hook members on a filter plate are adapted to be disengaged from the stud members by the movement of the actuating members mounted thereon which is effected by release pins on the preceding filter plate and to further provide means which, when the actuating members fail to operate due to external resistance as by sticking of the filtrate, forces the actuating members to function by an exceedingly greater force exerted upon the movement of the filter plate so as to disengage the hook members from the stud members.

DETAILED DESCRIPTION OF THE PREFERRED EMBODIMENTS

Figure 1:
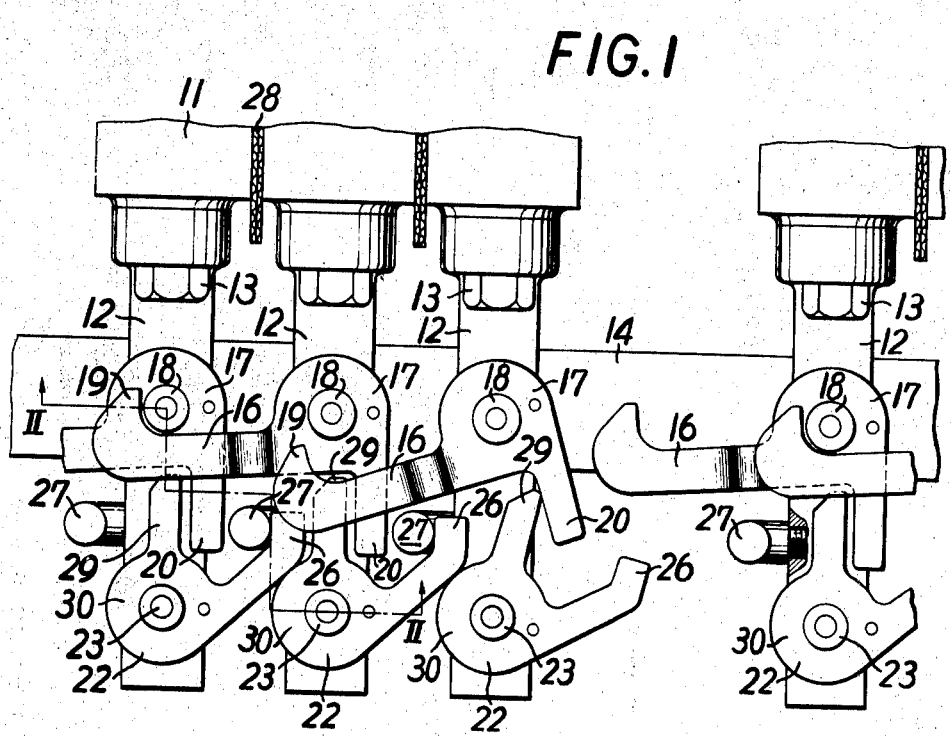
FIG. 1 is a plan view of an embodiment of the present invention, the view showing the principal part at one side of the filter plates.
Figure 2:
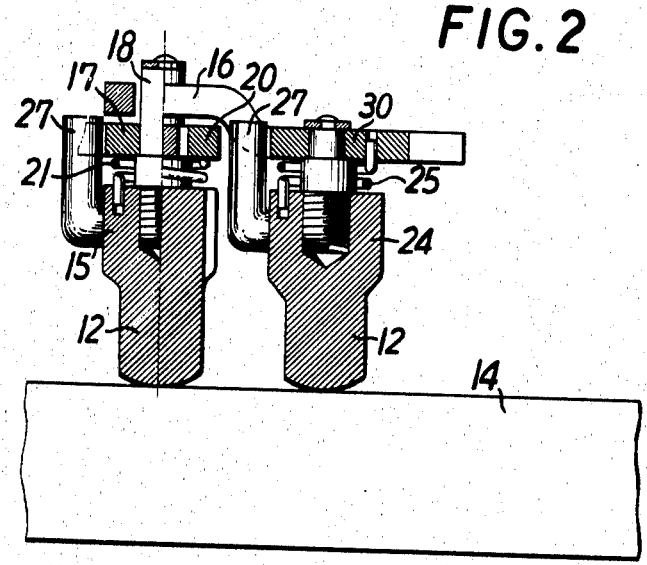
FIG. 2 is a bottom view showing the embodiment in FIG. 1, the view being partly in section along the lines II–II in FIG. 1.

FIGS. 1 and 2 illustrate an embodiment of the present invention in which the apparatus is provided on the extensions of handles of filter plates. Designates at 11 are filter plates with handles 12 extending sidewise and secured to the opposite sides thereof by bolts 13. The handles 12 of each filter plate are supported on side rails 14 at their under face. The boss 17 of a hook 16 is pivotally mounted by a stud member 18 on each boss support 15 disposed on the upper face proximate to the filter plate 11 of each handle 12. The hook 16 is provided with a slanting face 19 at its head to facilitate the reengagement of the hook 16 with the stud member 18 on the following filter plate and a tail member 20 at its tail end, a coil spring 21 acting between the hook 16 and the boss support 15.

An actuating member 22 having an actuating bar 29 to be engaged with the tail member 20 is mounted on a pivot 23 on another support 24 disposed away from the filter plate 11 and mounted on the handle 12, a coil spring 25 being provided between the actuating member 22 and the support 24. A release member 26 extending from the actuating member 22 is adapted to engage with a release pin 27 implanted in the handle 12 of the preceding filter plate 11. Designated at 28 is filter cloth. The coil spring 21 urges the hook 16 in the clockwise direction as seen the drawing so as to cause the hook 16 to engage with the stud member 18 all the time, while the actuating member 22 is urged in the clockwise direction as seen in the drawing under the action of the coil spring 25 acting thereon. The coil spring 25 is so designed that its elastic force is greater than that of the other coil spring 21. Accordingly, the actuating bar 29 tends to abut against the tail member 20 of the hook 16 and push it rightward in the drawing to always urge the hook 16 into counterclockwise pivotal movement against the action of the coil spring 21.

In known manner, the respective filter plates 11 are pressed together for filtration and after filtration they are separated from one another by a definite space. For filtering operation, the plates are brought together by a movable end plate (not shown), while the separation of the filter plates is effected by a transfer chain or the like (not shown). When a preceding filter plate 11 is moved, the release member 26 of the actuating member 22 on the following filter plate 11 is gradually relieved from the pressure of the boss 30 of the preceding actuating member 22 for clockwise pivotal movement. In accordance with the degree of separation between the preceding filter plate 11 and the following filter plate 11, the actuating member 22 is therefore turned clockwise by the coil spring 25 acting thereon. Due to this movement the actuating member 22 pushes the tail member 20 of the hook 16 rightward in the drawing by the actuating bar 29 and turns the hook 16 in the counterclockwise direction against the action of the coil spring 21. When the preceding filter plate 11 is sufficiently separated from the following second filter plate 11, the hook 16 on the second filter plate 11, thereby fully turned, is automatically released from the stud member 18 of the hook 16 on the third filter plate 11, this making it possible for the second filter plate 11 to get disengaged from the third filter plate 11. The second filter plate 11 is then moved by known transport means for separation from the third filter plate 11. In like manner, the rest of the filter plates are released and transported one by one.

After filter cake has been removed from the separated filter plates 11, the filter plates are pressed together for the subsequent filtration. At this time, the boss 30 of the actuating member 22 on the preceding filter plate 11 pushes the release member 26 of the actuating member 22 on the next filter plate 11 to thereby turn the actuating member 22 in the counterclockwise direction against the action of its coil spring 25. Consequently, the actuating bar 29 gets released from the tail member 20 of the hook 16, whereupon the hook 16 is turned clockwise by the coil spring 21 into engagement with the stud member 18 on the third filter plate. Thus, the filter plates are coupled with one another and get ready for the supply of the liquid to be filtered.

Due to sticking of filtrate or the like, there arises a case in which the hook or actuating member can not be operated only by the elastic force of the coil spring. In accordance with the present invention, when a preceding filter plate 11 is moved away from the following filter plate 11, the release pin 27 on the preceding filter plate 11 positioned on the left of the release member 26 as seen in the drawing forces the actuating member 22 on the following plate 11 to turn in the clockwise direction even if the coil spring 25 fails to move the actuating member 22 due to sticky filtrate notwithstanding that it is released from the boss 30 on the preceding filter plate 11. As a result, the hook 16 can be freed from engagement with the stud member 18 on the third filter plate 11 to enable the second filter plate 11 to be released from the third filter plate 11.

On the other hand, when the actuating member 22 is already returned by the elastic force of the coil spring 25 as each filter plate is brought into pressing engagement with the other plate as by a movable end plate but the hook 16 fails to move back to the original position due to sticking of the filtrate although it is adapted for engagement with the stud member 18 on the adjacent filter plate under the action of the coil spring 21, the release pin 27 on the preceding filter plate 11 positioned on the right of the tail member 20 on the following plate pushes the tail member 20, so that the hook 16 can be turned clockwise into engagement with the stud member 18 on the third plate 11.

Figure 3:
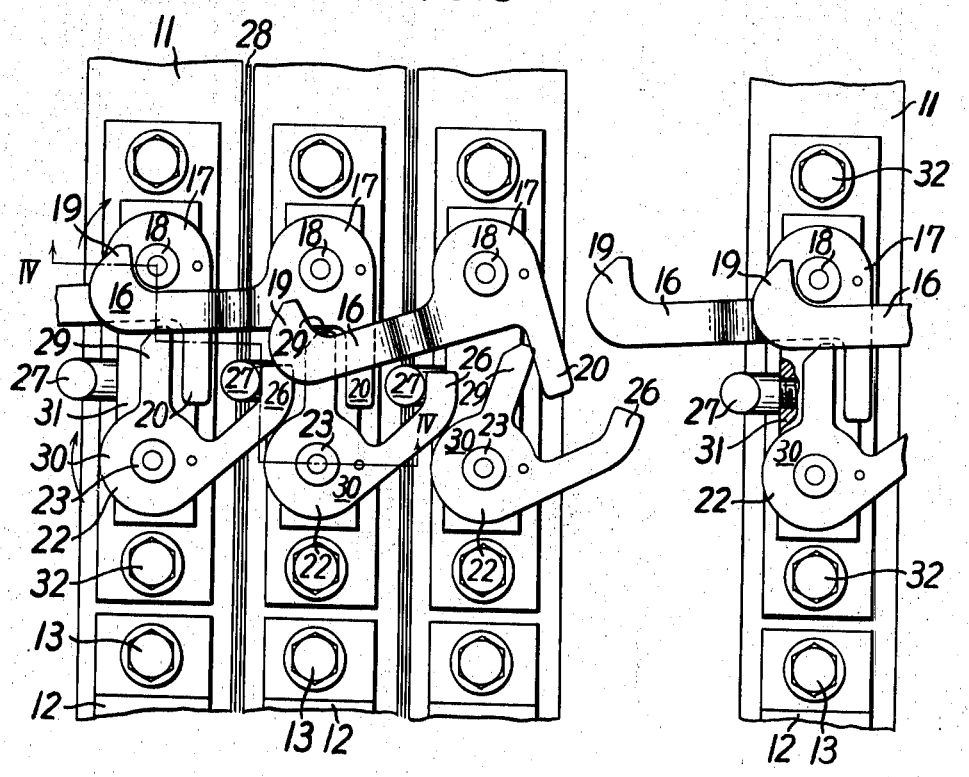
FIG. 3 is a side elevation showing another embodiment of the present invention with upper and lower portions of the filter plates omitted.
Figure 4:
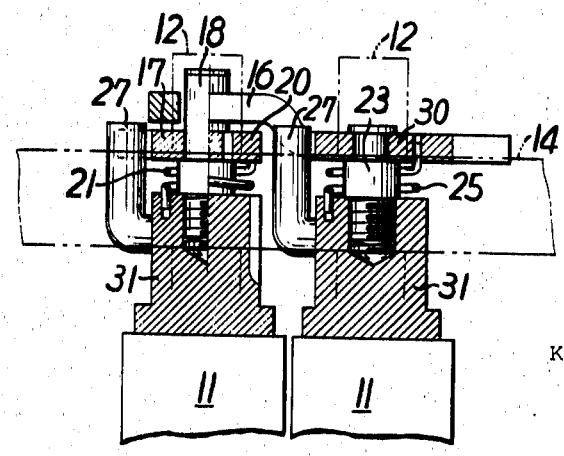
FIG. 4 is a bottom view showing the embodiment in FIG. 3, the view being partly in section along the line IV–IV in FIG. 3.

The embodiment shown in FIGS. 3 and 4 functions in the same manner as the foregoing embodiment shown in FIGS. 1 and 2 but the apparatus of the invention in this case is provided on the side portions of the filter plates. The same parts are indicated at the same reference numerals as in the embodiment in FIGS. 1 and 2. The hook 16, actuating member 22 and release pin 27 are mounted on a boss support 31 which is entirely independent of the filter plate 11. The boss support 31 is fixed to a desired portion of the filter plate by bolts 32 or the like. In the present embodiment, the boss support 31 is secured to the side portion of the filter plate 11 which is positioned above the handle 12 fixed to the plate 11 for supporting the plate 11 movably on a side rail. Since the boss support 31 is designed to be fixed to a desired portion on the filter plate, this embodiment is advantageous in that the present apparatus can be mounted on the desired portion of the filter plate 11 with ease.

I claim:

1. An apparatus for releasing and coupling filter plates in a filter press comprising a hook member pivotally mounted on each of the opposite sides of each filter plate and adapted to be engaged with a stud member on a following filter plate, a restoring spring acting on said hook member to urge said hook member into engagement with said stud member, an actuating member pivotally mounted on each filter plate and provided with an actuating bar to be engaged with a tail member of said hook member and a release member extending from another portion of said actuating member and adapted to be engaged with a release pin projecting from a preceding filter plate the actuating member and release member being so constructed and arranged along with said tail member to cause said hook member to disengage from a following filter plate.

2. The apparatus for releasing and coupling filter plates in a filter press as claimed in claim 1 wherein said hook member, actuating member and release pin are mounted on a boss support independent of the filter plate and said boss support is adapted to be fixed to a desired portion of each filter plate.

3. The apparatus for releasing and coupling filter plates in a filter press as claimed in claim 1 wherein the head portion of said hook member is formed with a slanting face which is adapted to be pushed upward by said stud member on the following filter plate.

4. An apparatus for releasing and coupling filter plates in a filter press comprising a hook member pivotally mounted on an extending portion of a handle secured to each of the opposite sides of each filter plate, a restoring spring acting on said hook member to urge said hook member into engagement with said stud member, an actuating member provided with an actuating bar to be engaged with a tail member of said hook member and pivotally mounted in a farther position on the extending portion of the handle, a restoring spring acting on said actuating member and a release member extending from another portion of said actuating member and adapted to be engaged with a release pin projecting from the handle of a preceding filter plate the actuating member and release member being so constructed and arranged along with said tail member to cause said hook member to disengage from a following filter plate.